(12) United States Patent
Sun (10) Patent No.: US 11,011,984 B2
(45) Date of Patent: May 18, 2021

(54) DYNAMIC LOAD TRANSIENT COMPENSATION

(71) Applicant: Texas Instruments Incorporated, Dallas, TX (US)

(72) Inventor: Yueming Sun, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 13 days.

(21) Appl. No.: 16/200,254

(22) Filed: Nov. 26, 2018

(65) Prior Publication Data

US 2020/0014299 A1 Jan. 9, 2020

Related U.S. Application Data (63) Continuation of application No. PCT/CN2018/094660, filed on Jul. 5, 2018.

(51) Int. Cl.
*H02M 3/158* (2006.01)

(52) U.S. Cl.
CPC .................. *H02M 3/158* (2013.01)

(58) Field of Classification Search
CPC ........ H02M 1/12; H02M 1/42; H02M 1/4225; H02M 1/4233; H02M 1/4241; H02M 1/4258; H02M 1/425; H02M 1/4208; H02M 2003/1552; H02M 2001/4283; H02M 2001/4291
See application file for complete search history.

(56) References Cited

U.S. PATENT DOCUMENTS

| | | | |
|---|---|---|---|
| 6,605,931 B2 | 8/2003 | Brooks | |
| 9,692,433 B2 | 6/2017 | Shill et al. | |
| 2010/0164457 A1 | 7/2010 | Al-Shyoukh | |
| 2012/0126761 A1* | 5/2012 | Tuten | H02M 3/156 323/271 |
| 2014/0062434 A1* | 3/2014 | Ouyang | H02M 3/156 323/271 |
| 2016/0261198 A1 | 9/2016 | Li | |
| 2018/0248479 A1* | 8/2018 | Fan | H02M 3/158 |
| 2018/0351452 A1* | 12/2018 | Clavette | H02M 3/156 |

FOREIGN PATENT DOCUMENTS

| | | |
|---|---|---|
| CN | 101753022 A | 6/2010 |
| CN | 102608404 A | 7/2012 |
| CN | 104682745 A | 6/2015 |
| CN | 106575129 A | 4/2017 |

OTHER PUBLICATIONS

Search Report for PCT/CN2018/094660, dated Mar. 27, 2019.

* cited by examiner

*Primary Examiner* — Bryan R Perez (74) *Attorney, Agent, or Firm* — Mark Allen Valetti; Charles A. Brill; Frank D. Cimino (57) ABSTRACT

A circuit includes a power stage circuit configured to perform power conversion of an input voltage to provide an output voltage at an output. The circuit further includes a driver circuit configured to drive the power stage circuit to provide the output voltage. The circuit further includes a load transient dynamic compensator configured to detect a rate of change in the output voltage during load transient and to supply a compensating signal based on the rate of change. The circuit further includes a feedback control circuit configured to generate a series of pulses to control the driver circuit based on the output voltage and the compensating signal.

16 Claims, 6 Drawing Sheets

DYNAMIC LOAD TRANSIENT COMPENSATION

TECHNICAL FIELD

This disclosure relates to integrated circuits and, more particularly, to circuitry and methods to compensate for load transients in power converters.

BACKGROUND

Switched-mode direct current to direct current (DC-DC) converters represent a primary category for power supply design. For example, a switched-mode DC-DC converter may exceed ninety percent power conversion efficiency and thus has been widely used to supply power in all types of electronic devices, such as computers, cell phones, televisions, and so forth. In a switched-mode DC-DC converter, the control loop design determines performance parameters of the converter such as speed of load transient response, DC accuracy and design cost which includes die size for the converter, and the number of off-chip components, for example.

SUMMARY

In one example, a circuit includes a power stage circuit configured to perform power conversion of an input voltage to provide an output voltage at an output. The circuit further includes a driver circuit configured to drive the power stage circuit to provide the output voltage. The circuit further includes a load transient dynamic compensator configured to detect a rate of change in the output voltage during load transient and to supply a compensating signal based on the rate of change. The circuit further includes a feedback control circuit configured to generate a series of pulses to control the driver circuit based on the output voltage and the compensating signal In another example, a method includes performing a power conversion of an input voltage to provide an output voltage at an output. The method further includes providing a driver signal for driving the power conversion. The method further includes determining a rate of change in the output voltage over a predetermined time period. The method further includes supplying a compensating signal based on the rate of change. The method further includes generating a series of pulses to control the driver signal based on the output voltage and the compensating signal.

In yet another example, a semiconductor device includes a power stage circuit configured to perform power conversion of an input voltage to provide an output voltage at an output. The semiconductor device further includes a driver circuit configured to drive the power stage circuit to provide the output voltage. The semiconductor device further includes a load transient dynamic compensator. The load transient dynamic compensator is configured to detect a load transient by detecting a change in the output voltage greater than a predetermined threshold amount. The load transient dynamic compensator is further configured to detect a rate of change in the output voltage during the load transient. The load transient dynamic compensator is further configured to supply a compensating signal based on the rate of change. The semiconductor device further includes a feedback control circuit configured to generate a series of pulses to control the driver circuit based on the output voltage and the compensating signal.

DETAILED DESCRIPTION

This disclosure relates to a method and circuit to compensate for the load variation dynamically.

In particular, described herein is a method and circuit to estimate load transient based on a declining rate of an output voltage and compensate it dynamically. The result can be used to guide a command voltage to a new regulating value faster and therefore reduce undershoot and/or overshoot in the output voltage. In order to avoid influencing a regulating loop frequently, the compensating method and circuit operates when the load transient is determined to be significant enough (e.g., transient level exceeds a threshold).

Although the examples described herein make specific reference to supplying a compensation signal to reduce voltage undershoot during a load transient, the example system and method may similarly be used to supply a compensation signal to reduce voltage overshoot during a load transient. Thus, in some examples, systems and methods disclosed herein is configured to compensate for both positive and negative load transients (e.g., to mitigate overshoot and undershoot).

Figure 1:
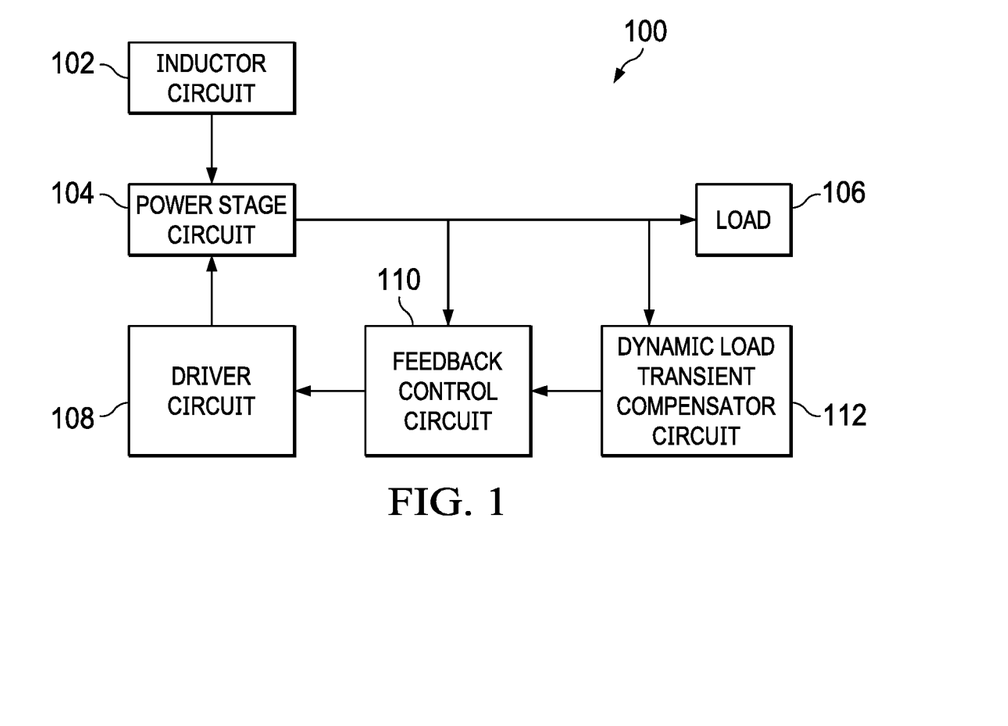
FIG. 1 illustrates an example schematic block diagram of a DC-DC converter circuit with dynamic load transient compensation.

FIG. 1 illustrates an example schematic block diagram of a DC-DC converter circuit with dynamic load transient compensation ("converter circuit") 100. As used herein, for example, the term circuit can include a collection of active and/or passive elements that perform a circuit function such as an analog circuit or control circuit. Additionally or alternatively, the term circuit can include an integrated circuit (IC) where all and/or some of the circuit elements are fabricated on a common substrate, such as a semiconductor device (e.g., IC chip).

The converter circuit 100 includes an inductor circuit 102 configured to receive an input voltage. In one example, the inductor circuit 102 can be provided externally to the converter circuit 100. In other examples, the inductor circuit 102 can be internal and integrated with the converter circuit 100. A power stage circuit 104 is configured to perform power conversion of the input voltage to provide an output voltage to an output to which a load 106 can be connected. A driver circuit 108 is configured to drive the power stage circuit 104 in response to a control signal (e.g., a pulse width modulated ("PWM") signal). A feedback control circuit 110 is configured to generate the input pulses to control the driver circuit 108 based on the output for driving the load 106.

A dynamic load transient compensator circuit 112 is configured to monitor a rate of change of the output voltage at the load 106 and supply a compensation signal to the feedback control circuit 110 to reduce voltage undershoot during a load transient. For example, the dynamic load transient compensator circuit 112 monitors the output voltage at the load 106 to identify when the output voltage drops below a predetermined threshold. As one example, the dynamic load transient compensator circuit 112 may become active in response to detecting the output voltage at the load 106 dropping by more than 1% of a target output voltage (e.g., a target boundary or a reference voltage) since a change of less than 1% may be acceptable. Other thresholds may be used in other examples, such as according to desired operating conditions. Thus, the dynamic load transient compensator circuit 112 activates when the load transient is significant enough, thereby avoiding unnecessarily influencing the regulating loop frequently. Once activated, the dynamic load transient compensator circuit 112 estimates the load transient by measuring a rate of change of the output voltage. The dynamic load transient compensator circuit 112 is configured to provide a compensation signal to the feedback control circuit 110 to compensate for the detected load transient dynamically based on the measured rate of change in the output voltage. For example, the feedback control circuit 110 employs the compensation signal to more quickly position the command voltage to the new regulation value and thereby reduce the undershoot.

Figure 2:
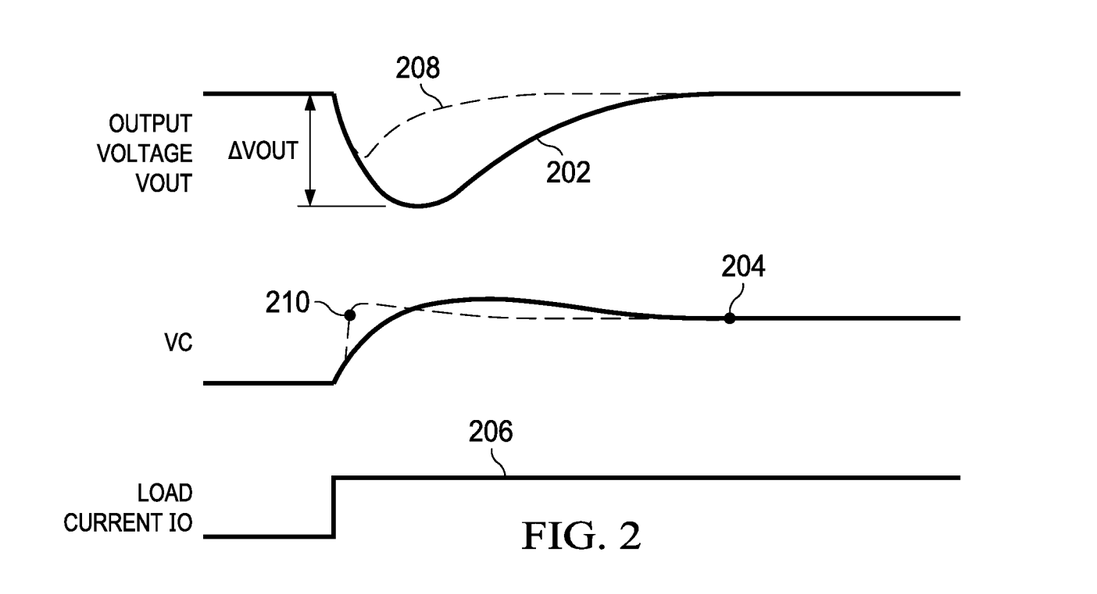
FIG. 2 illustrates an example signal diagram comparing the example DC-DC converter circuit of FIG. 1 with an existing approach.

FIG. 2 illustrates an example waveform comparison of a load transient without dynamic compensation and load transient with dynamic compensation. For example, the graph demonstrates a first output voltage transient response 202 and a first command voltage 204 that are generated by the load current 206 without dynamic compensation. Additionally, the graphs show a second output voltage transient response 208 and a second command voltage 210 that are generated by the load current 206 with dynamic compensation. The graph thus demonstrates that the power system implementing dynamic compensation, as disclosed herein, mitigates output voltage undershoot during the transient event.

Figure 3:
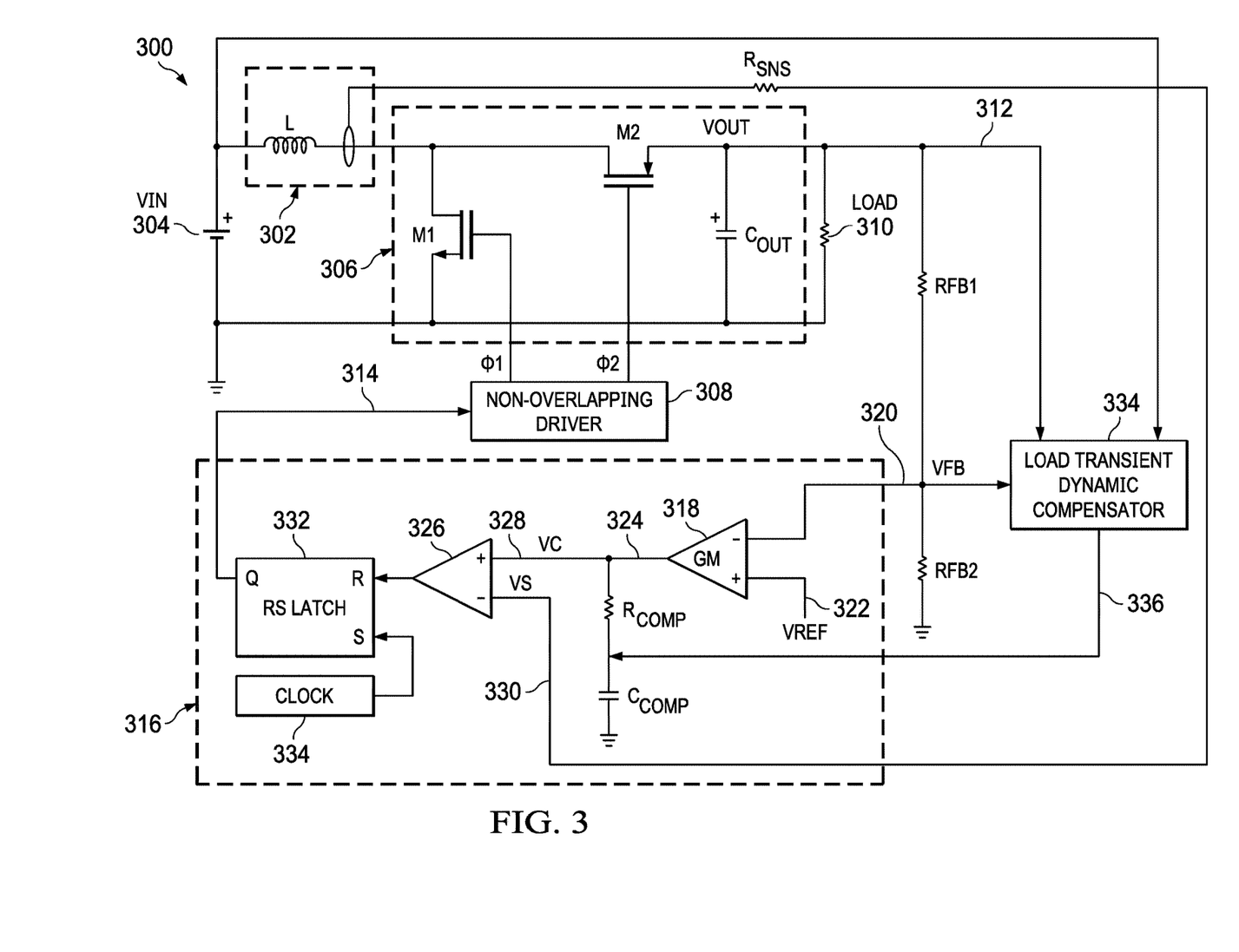
FIG. 3 illustrates an example integrated circuit diagram of the DC-DC converter circuit with dynamic load transient compensation of FIG. 1.

FIG. 3 illustrates an example circuit diagram of a converter circuit 300 (e.g., corresponding to the converter circuit 100 of FIG. 1). The converter circuit 300 can be implemented as a semiconductor device that interfaces with external components. An inductor circuit 302 includes an inductor L that receives an input voltage $V_{in}$ at a corresponding input 304. A power stage circuit 306 converts the input voltage $V_{in}$ to provide an output voltage $V_{out}$ at an output 312 to which a load 310 is connected. In this example, an output capacitor $C_{out}$ is connected in parallel with the load 310. The power stage circuit 306 is configured to activate and deactivate switch devices (e.g., demonstrated as transistor devices M1 and M2). A driver circuit 308 is connected to drive the power stage circuit 306 in response to a control signal (e.g., PWM signals) 314 generated by a feedback control circuit 316. The feedback control circuit 316 is configured to generate the control signal 314 to control the driver circuit 308 based on the output voltage $V_{out}$ for driving the load 310.

As an example, the feedback control circuit 316 includes an error amplifier 318 which compares a feedback voltage $V_{FB}$ at an input 320 with a reference voltage $V_{REF}$ received at another input 322 to produce a command voltage $V_c$ at an output 324 of the error amplifier 318. For example, the feedback voltage $V_{FB}$ is generated by a divider circuit connected in parallel with the load 310, such as a resistive-divider formed by resistors Rfb1 and Rfb2 connected in series between the output voltage $V_{out}$ and ground.

A current comparator circuit 326 compares the command voltage $V_c$ at a non-inverting input 328 with a sensed current signal $V_s$ provided to an inverting input 330, such as by connecting a sense resistor $R_{sns}$ to measure the current through the inductor L. The current comparator circuit 326 provides a comparator output to an input of a buffer circuit, such as a reset input of a set-reset latch 332, based on the comparison. The set-reset latch 332 also is connected to receive a clock signal at the set input such as provided by an internal clock generator 334. The set-reset latch 332 thus provides a pulsed signal at its Q output based on comparator signal that is latched in according to the clock signal. In this way, the current comparator circuit 326 controls the timing of the first transistor M1 via the set-reset latch 332 based on a measurement of the current through the inductor L relative to the command voltage $V_c$.

Additionally, a dynamic load transient compensator circuit 334 is configured to dynamically adjust the command voltage $V_c$ based on the feedback voltage $V_{FB}$, the output voltage $V_{out}$ and the input voltage $V_{in}$. For example, the dynamic load transient compensator circuit 334 is configured to monitor the output voltage $V_{out}$ to identify when the output voltage $V_{out}$ drops below a predetermined threshold (e.g., approximately 99% of a target output voltage). In response to detecting the drop below the threshold voltage level, the dynamic load transient compensator circuit 334 monitors the rate of change of output voltage $V_{out}$ and supplies a compensation signal at an output 336 to dynamically boost the command voltage $V_c$ according to the monitored rate of change (e.g., a negative load transient condition). For example, the dynamic load transient compensator circuit 334 is connected to supply the compensation signal to a compensation capacitor $C_{comp}$ that is connected to the input 328 of the current comparator circuit 326 through a resistor $R_{comp}$. The compensation signal can supply current to charge capacitor $C_{comp}$ and thereby dynamically adjust the command voltage $V_c$ according to the monitored rate of change in the output during a detected transient condition.

In some examples, the dynamic load transient compensator circuit 334 is configured to monitor the output voltage $V_{out}$ for both positive and negative transients. For instance, the dynamic load transient compensator circuit 334 is configured to determine if the output is above a predetermined high threshold (e.g., for positive load transients) and/or if the output is below a predetermined low threshold (e.g., for negative load transients). If either positive or negative threshold is exceeded, as detected by the dynamic load transient compensator circuit 334, the load transient compensator circuit 334 can provide an appropriate compensation signal to boost or reduce the command voltage $V_c$. Thus, the dynamic load transient compensator circuit 334 may be configured to compensate for either undershoot or overshoot during transient load conditions.

Figure 4:
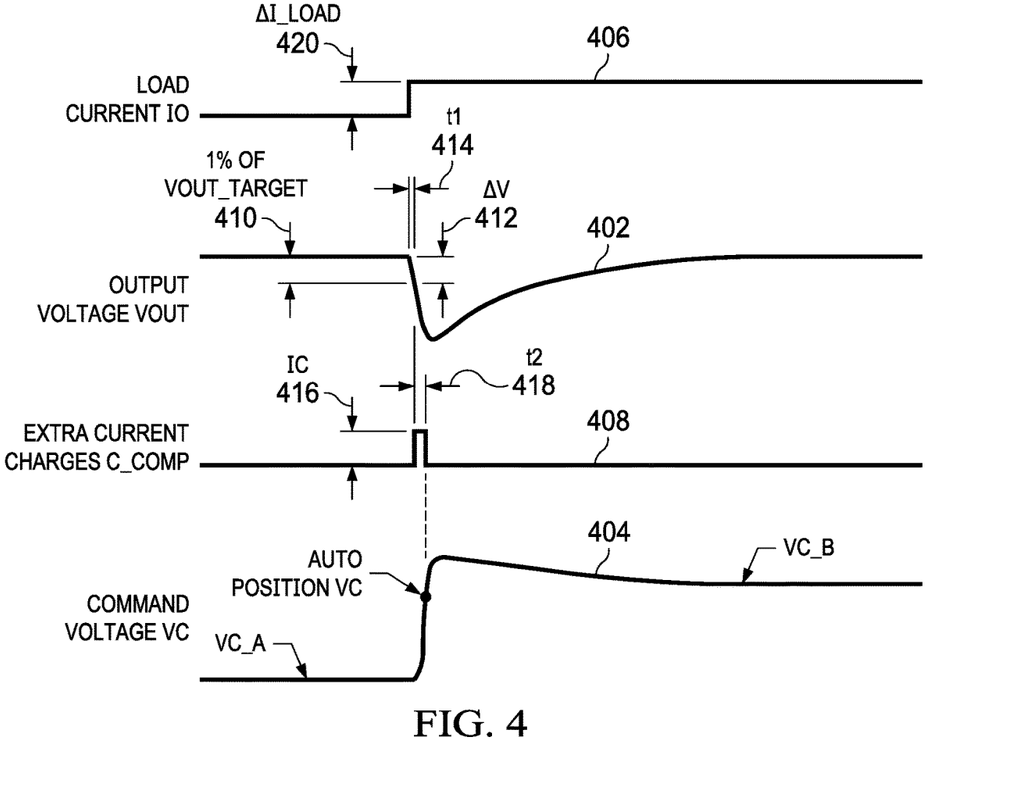
FIG. 4 illustrates an example signal diagram of the example DC-DC converter circuit with dynamic load transient compensation of FIG. 3.

FIG. 4 is a graph of waveforms demonstrating operation of the converter circuit 300 of FIG. 3. In this example, the waveforms include an output voltage transient response 402 and the command voltage 404 that are generated by a load current 406 with dynamic compensation. Also illustrated is a compensation signal 408, or compensation current, introduced by the dynamic load transient compensator circuit 334 of FIG. 3. As described, the dynamic load transient compensator circuit 334 is activated when the output voltage transient response 402 drops a predetermined amount 410, such as approximately 1% of a target $V_{out}$. After the output voltage transient response 402 drops the threshold amount from the target voltage, the dynamic load transient compensator circuit 334 begins to monitor the magnitude of output voltage 402 and determine a change 412 in the output voltage 402, demonstrated as ΔV during the monitoring time interval 414 designated as $T_1$. In one example, the dynamic load transient compensator circuit 334 includes an internal timer for generating the monitoring time interval $T_1$. The monitoring time interval $T_1$ may be fixed or, in other examples, may be programmable by configuring the timer.

By way of further example, assuming that the command voltage 404 does not change significantly until the end of $T_1$, a change in amount of load current 420, designated as $\Delta I_{load}$, will be supplied by the output capacitor $C_{out}$. For example, this relationship may be expressed by the equation:

$$\Delta V_c \times C_{out} = \Delta I_{load} \times T_1 \quad (1)$$

The command voltage 404 before a load transient is depicted as $V_{c\_a}$. The command voltage 404 after the load transient is depicted as $V_{c\_b}$. The variation in the command voltage variation $\Delta V_{EA}$ from before load transient $V_{c\_a}$ to after load transient $V_{c\_b}$, which reflects inductor current variation $\Delta I_{sw}$, for example, may be expressed by the equation:

$$\Delta V_{EA} = \Delta I_{sw} \times R_{sns} \quad (2)$$

The relation between the inductor current variation $\Delta I_{sw}$ and load current variation $\Delta I_{load}$ for the boost converter may be expressed by the equation:

$$\Delta I_{load} = \Delta I_{sw} \times (1-D) = \Delta I_{sw} \times V_{in}/V_{out} \quad (3)$$

where D is the duty cycle of the PWM signal provided to the driver circuit 308 of FIG. 3.

Using equations (1) and (2), the command voltage variation $\Delta V_{EA}$ may be calculated as:

$$\Delta V_{EA} = \Delta V \times C_{out} \times [(\Delta I_{sw} \times R_{sns})/(\Delta I_{load} \times T_1)] \quad (4)$$

Substituting the load current variation $\Delta I_{load}$ from equation (3) into equation (4) yields:

$$\Delta V_{EA} = \Delta V \times C_{out} \times [(V_{out} \times R_{sns})/(V_{in} \times T_1)] \quad (5)$$

To adjust the command voltage 404 to the new regulating value $V_{c\_b}$ quickly, the dynamic load transient compensator circuit 334 provides a constant compensation current 408 to charge the compensation capacitor $C_{comp}$ of the feedback control circuit 316 of FIG. 3. The dynamic load transient compensator circuit 334 is configured to provide the constant compensation current 416, designated as $I_c$ (also illustrated as compensation signal at output 336 in FIG. 3) to charge the compensation capacitor $C_{comp}$ for a duration of compensation time 418, designated as $T_2$. To avoid over-boosting, in some examples, the compensation time $T_2$ is determined according to the equation:

$$T_2 = (\Delta V_{EA} \times C_{comp})/I_c \quad (6)$$

Substituting equation (5) into equation (6), $T_2$ can be expressed as:

$$T_2 = \Delta V \times C_{out} \times [(V_{out} \times R_{sns})/(V_{in} \times T_1)] \times (C_{comp}/I_c) \quad (7)$$

In one example, the dynamic load transient compensator circuit 334 is configured to sense or determine ΔV, $V_{in}$ and $V_{out}$, while $R_{sns}$, $C_{comp}$, $T_1$ and $I_c$ are predetermined fixed parameters. In an example, the filtering output capacitor $C_{out}$ may be an external component and therefore the capacitance of the output capacitor $C_{out}$ may not be easily sensed as it is connected with the load 306 in series. For example, the value of the output capacitor $C_{out}$ may be chosen to have a minimum allowed value specified in an operating condition table.

Figure 5:
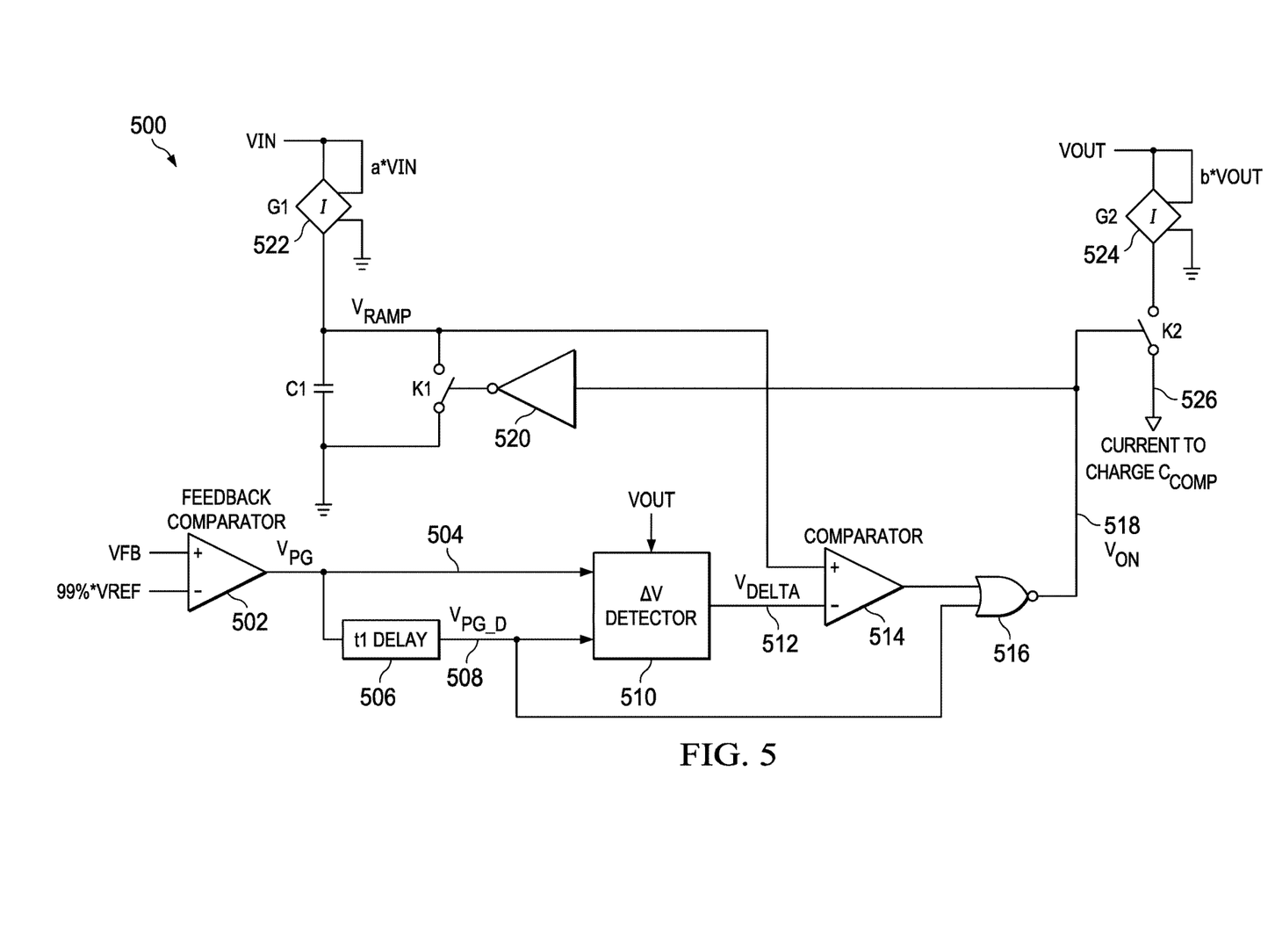
FIG. 5 illustrates an example integrated circuit diagram of the dynamic load transient compensator of FIG. 3.

FIG. 5 illustrates an example of a dynamic load transient compensator circuit 500 (e.g., circuit 112 of FIG. 1 and circuit 334 of FIG. 3). The dynamic load transient compensator circuit 500 is configured to regulate the compensation signal at output 336, which may be provided as a current to charge the compensation capacitor $C_{comp}$ (see, FIG. 3). For example, while output voltage $V_{out}$ is well regulated (e.g., above 99% of a target $V_{out}$), the dynamic load transient compensator circuit 500 is in an inactive state. While the dynamic load transient compensator circuit 500 is in the inactive state, the first switch K1 is in the on position and switch K2 is in the off position.

The dynamic load transient compensator circuit 500 includes a first feedback comparator 502 for determining a load transient condition. For example, the comparator 502 has a first input to receive a feedback voltage $V_{FB}$ (e.g., corresponding to $V_{FB}$ at input 320 in FIG. 3) and another input to receive a reference voltage, such as 99% of a reference voltage (e.g., $V_{REF}$ at input 322 of FIG. 3). The feedback comparator 502 thus provides a feedback comparator signal $V_{pg}$ at an output 504 during a load transient detected if output voltage $V_{out}$ crosses a threshold boundary, such as the 99% of the target $V_{out}$. A delay timer 506 delays the feedback comparator signal $V_{pg}$ for time $T_1$ and produces a delayed feedback comparator signal $V_{pg\_d}$ at an output 508.

The dynamic load transient compensator circuit 500 further includes a voltage change detector 510 for determining a voltage change between the feedback comparator signal $V_{pg}$ and the delayed feedback comparator signal $V_{pg\_d}$ at time $T_1$. For example, the voltage change detector 510 receives the feedback comparator signal $V_{pg}$ via an input coupled with output 508 and the delayed feedback comparator signal $V_{pg\_d}$ at another input coupled with the output 504. The voltage change detector 510 is configured to generate an output signal $V_{delta}$ at its output 512 representing the difference between $V_{pg}$ and $V_{pg\_d}$. A second comparator 514 is configured to receive the signal $V_{delta}$ generated by the voltage change detector 510 at an inverting input that is coupled with the output 512. The comparator 514 also receives a ramp voltage Vramp at its non-inverting input. The output of the comparator 514 is coupled to an input of a logic gate 516 (e.g., a NOR-gate).

The gate 516 is also configured to receive the delayed feedback comparator signal $V_{pg\_d}$ at another input. An output 518 of the gate 516 is coupled to drive respective first and second switches K1 and K2 based on the output of the comparator 514 which is logically NORed with the delayed feedback comparator signal $V_{pg\_d}$. For example, the output 518 of the gate 516 is coupled directly to switch K2 and is coupled with K1 through an inverter 520, such that the switches K1 and K2 are operated in a mutually exclusive manner. The switch K1 is connected in parallel with a capacitor C1, and a first controlled current source (e.g., a voltage controlled current source) 522 is connected to supply current a*$V_{in}$ to the capacitor C1 to generate the ramp voltage Vramp. Thus, when the gate 516 deactivates the switch K1 to a closed (e.g., short circuit) condition via switch control signal $V_{on}$ (e.g., a logic high), the capacitor C1 discharges to cause the ramp voltage Vramp to decrease accordingly. While the first switch K1 is activated to the open position, the charging current a*$V_{in}$ from the voltage controlled current source 522, which is in proportion to input voltage $V_{in}$, charges capacitor C1 to provide the ramp voltage $V_{ramp}$ across the capacitor C1, which is provided to the second comparator 514, as disclosed herein. The second comparator 514 is also configured to receive the ramp voltage $V_{ramp}$ at a non-inverting input and provide a logic output (e.g., high or low) based on whether the ramp voltage $V_{ramp}$ exceeds the voltage change Vdelta.

The gate 516 is also configured to control the second switch K2 based on the switch control signal $V_{on}$ provided at the output 518. The switch K2 is connected between a second controlled current source 524 and an output 526. The switch K2 thus is configured to supply a current pulse at the output 526 (e.g., corresponding to the compensation signal at the output 336 in FIG. 3) to the compensation capacitor $C_{comp}$. The current pulse has a magnitude that is controlled by the second voltage controlled current source 524 in proportion to $V_{out}$ (b*$V_{out}$). Thus, the dynamic load transient compensator circuit 500 is in an active state while the first switch K1 is off and the second switch K2 is on. The duration of the current pulse depends on the comparison between the voltage ramp $V_{ramp}$ and the delta signal $V_{delta}$. For example, in response to the second comparator 514 detecting that the voltage ramp $V_{ramp}$ has increased (e.g., based on charging C1 based on the current a*Vin) to a level commensurate with the voltage change signal $V_{delta}$, the second comparator 514 provides a logic high output to the logic gate 516, which in turn sets the $V_{on}$ signal 728 at the output 518 to logic low. In response to the $V_{on}$ signal going low, the circuit 500 changes to its inactive state. In the inactive state, the logic gate 516 thus turns the first switch K1 on to discharge C1 and turns the second switch K2 off, such that the compensation signal is not supplied to the compensation capacitor $C_{comp}$ via the output 526. The circuit 500 thus can operate between its active and inactive states depending on the feedback voltage $V_{FB}$ indicating a transient condition, as disclosed herein.

Figure 6:
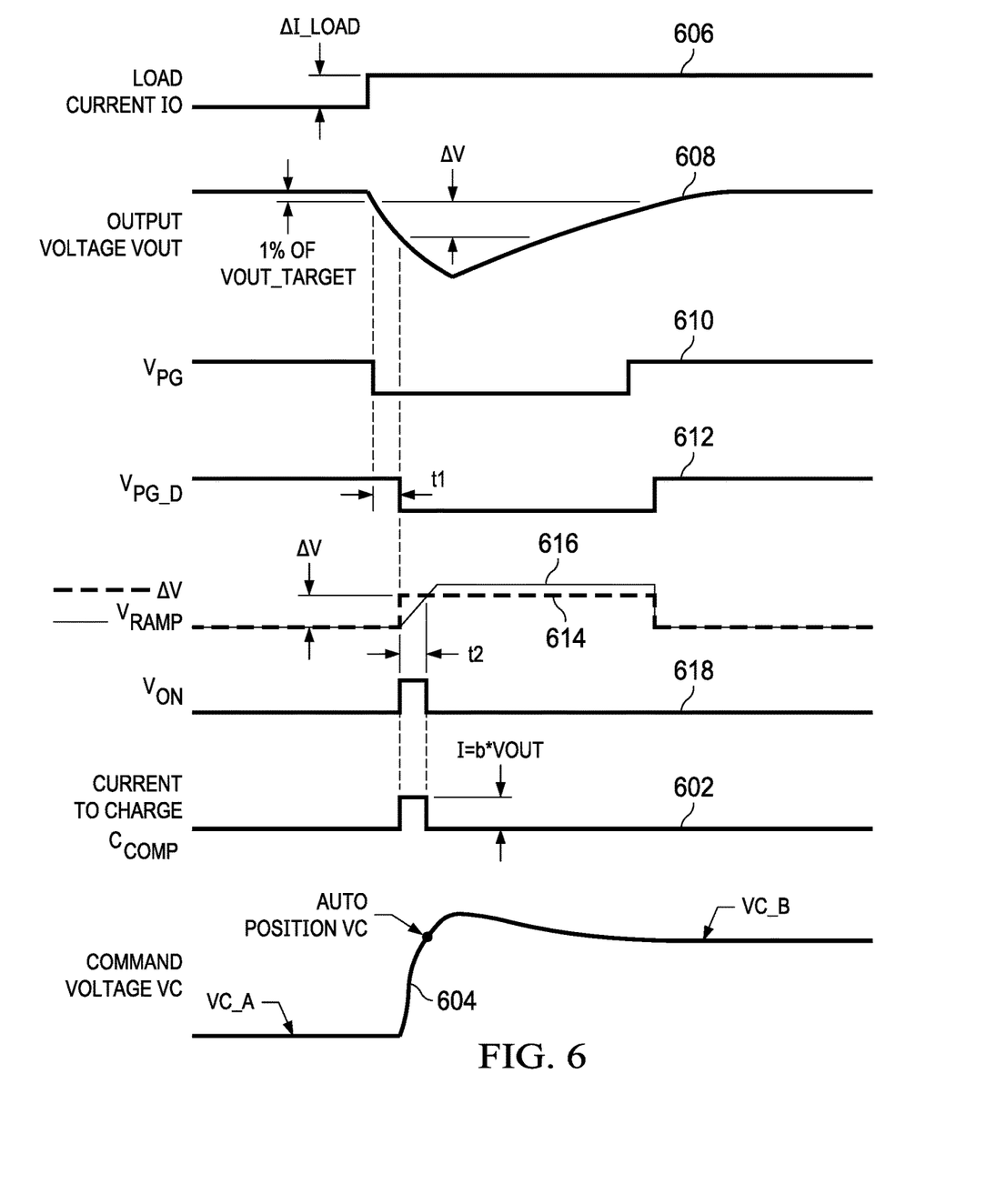
FIG. 6 illustrates another example signal diagram of the example DC-DC converter circuit with dynamic load transient compensation of FIG. 3.

FIG. 6 illustrates waveforms including an output voltage transient response 602 and a command voltage 604 that are generated by a load current 606 with dynamic compensation, such as disclosed herein (see, e.g., FIGS. 2 and 4) as well as the compensation signal 608 introduced by the dynamic load transient compensator circuit 500 as illustrated in FIG. 5. Further illustrated is a feedback comparator signal $V_{pg}$ waveform 610, a delayed feedback comparator signal $V_{pg\_d}$ waveform 612, a delta signal $V_{delta}$ waveform 614, a voltage ramp $V_{ramp}$ waveform 616, and a $V_{on}$ signal waveform 618, corresponding to the feedback comparator signal $V_{pg}$, the delayed feedback comparator signal $V_{pg\_d}$, the delta signal $V_{delta}$, the voltage ramp $V_{ramp}$, and the $V_{on}$ signal described in FIG. 5.

Figure 7:
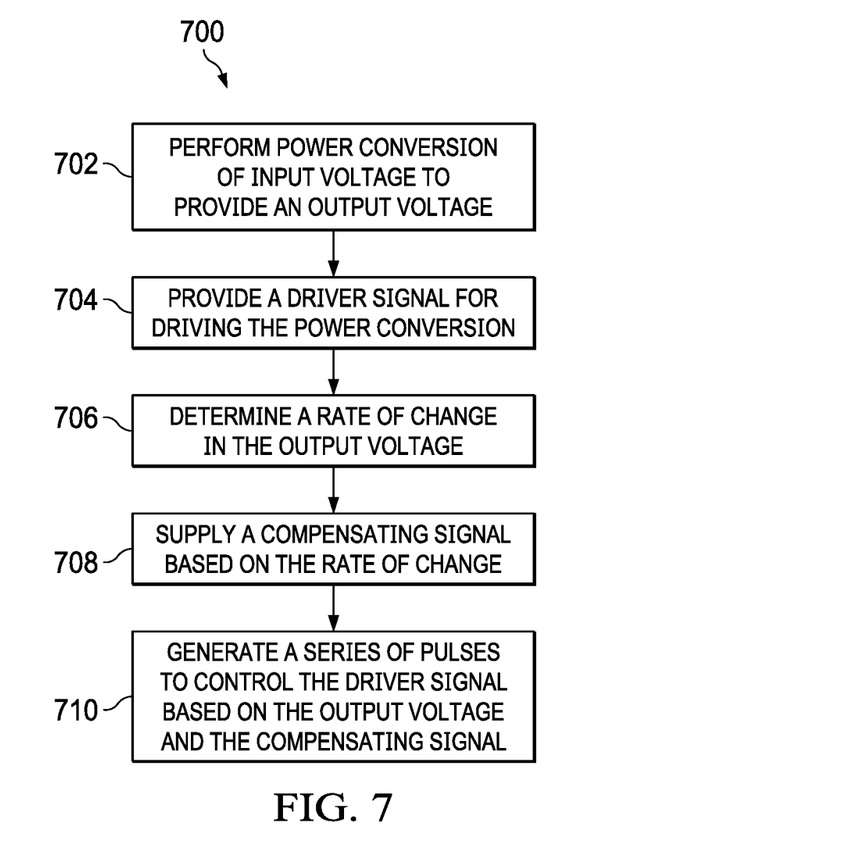
FIG. 7 is a flow diagram that illustrates an example method to dynamically compensate for load transient of a DC-DC converter.

In view of the foregoing structural and functional features described above, an example method will be better appreciated with reference to FIG. 7. While, for purposes of simplicity of explanation, the method is shown and described as executing serially, it is to be understood and appreciated that the method is not limited by the illustrated order, as parts of the method could occur in different orders and/or concurrently from that shown and described herein. For example, such methods can be executed by various components configured in an integrated circuit, processor, or a controller.

FIG. 7 illustrates an example method 700 for dynamic load transient compensation. At 702, the method 700 includes performing a power conversion (e.g., by power stage circuit 108 of FIG. 1 or 306 of FIG. 3) of an input voltage to provide an output voltage at an output. At 704, the method 700 includes providing a driver signal (e.g., by driver circuit 108 of FIG. 1 or 312 of FIG. 3) for driving the power conversion. At 706, the method 700 includes determining a rate of change in the output voltage over a predetermined time period. For example, the rate of change may be determined by load transient dynamic compensation circuitry (e.g., by dynamic load transient compensator circuit 112 of FIG. 1 or 334 of FIG. 3). At 708, the method 700 includes supplying a compensating signal based on the determined rate of change (e.g., by dynamic load transient compensator circuit 112 of FIG. 1 or 334 of FIG. 3). At 710, the method 700 includes generating a series of pulses (e.g., by feedback control circuit 110 of FIG. 1 or 316 of FIG. 3) to control the driver signal based on the output voltage and the compensating signal.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. Additionally, where the disclosure or claims recite "a," "an," "a first," or "another" element, or the equivalent thereof, it should be interpreted to include one or more than one such element, neither requiring nor excluding two or more such elements.

What is claimed is:

1. A circuit, comprising:
   a power stage circuit configured to perform power conversion of an input voltage to provide an output voltage at an output;
   a driver circuit configured to drive the power stage circuit to provide the output voltage;
   a load transient dynamic compensator configured to detect a rate of change in the output voltage during load transient and to supply a compensating signal by supplying a constant compensation current to charge a compensation capacitor of a feedback control circuit;
   the feedback control circuit configured to generate a series of pulses to control the driver circuit based on the output voltage and the compensating signal; and
   wherein the compensating signal is based on a rate of change of the output voltage.

2. The circuit of claim 1, wherein the load transient dynamic compensator is configured to detect the rate of change in the output voltage during load transient and to supply the compensating signal responsive to detecting a change in the output voltage greater than a predetermined threshold amount.

3. The circuit of claim 2, wherein the load transient dynamic compensator is configured to detect a positive change in the output voltage and the load transient dynamic compensator is configured to detect a negative change in the output voltage.

4. The circuit of claim 2, wherein:
   the load transient dynamic compensator comprises a first switch and a second switch;
   the load transient dynamic compensator is configured to be inactive, denoted by the first switch in an on position and the second switch in an off position, while the load transient dynamic compensator detects the change in the output voltage to be less than the predetermined threshold amount; and
   the load transient dynamic compensator is configured to supply the compensating signal in an active state, denoted by the first switch in an on position and the second switch in an off position, while the load transient dynamic compensator detects the change in the output voltage to be greater than the predetermined threshold amount.

5. The circuit of claim 1, wherein the feedback control circuit comprises:
an error amplifier circuit configured to compare a feedback voltage with a reference voltage to produce a command voltage; and
a current comparator circuit configured to compare the command voltage with the output voltage to generate the series of pulses;
wherein the load transient dynamic compensator is configured to supply the compensating signal to boost the command voltage.

6. The circuit of claim 1, wherein the load transient dynamic compensator is configured to supply the compensating signal for a determined compensation duration time.

7. The circuit of claim 1, wherein the load transient dynamic compensator comprises a timer configured to generate a fixed monitoring time interval for detecting the rate of change in the output voltage.

8. A method, comprising:
performing a power conversion of an input voltage to provide an output voltage at an output;
providing a driver signal for driving the power conversion;
determining a rate of change in the output voltage over a predetermined time period;
supplying a constant compensation current to charge a compensation capacitor to generate a compensating signal based on the rate of change; and
generating a series of pulses to control the driver signal based on the output voltage and the compensating signal.

9. The method of claim 8, further comprising detecting a change in the output voltage during a load transient greater than a predetermined threshold amount, and determining the rate of change in the output voltage over the predetermined time period responsive to detecting the change in the output voltage during load transient greater than the predetermined threshold amount.

10. The method of claim 9, wherein detecting the change in the output voltage comprises detecting a positive change in the output voltage and detecting a negative change in the output voltage.

11. The method of claim 8:
wherein generating the series of pulses to control the driver signal comprises:
comparing a feedback voltage with a reference voltage to produce a command voltage; and
comparing the command voltage with the output voltage to generate the series of pulses; and
wherein supplying the compensating signal comprises supplying the compensating signal to boost the command voltage.

12. The method of claim 8, wherein supplying the compensating signal comprises supplying the compensating signal for a determined compensation duration time.

13. A circuit comprising:
a power converter including an input and an output, the input coupled to an input voltage;
a driver circuit coupled with the power converter;
a load compensator circuit having an input coupled to the output of the power converter and having an output, the load compensator circuit comprising:
a first switch coupled between the between the output of the load compensator circuit and a current source;
a first comparator circuit including inputs coupled to a feedback voltage and a reference voltage;
a delay timer circuit having an input coupled to an output of the first comparator circuit;
a change in voltage detector circuit having inputs coupled with the output of the first comparator circuit and an output of the delay timer circuit;
a second comparator having a first input coupled with an output of the change in voltage detector circuit and a second input coupled with a ramp voltage source circuit; and
logic circuit having an input coupled with an output of the second comparator and another input coupled with output of the delay timer circuit, an output of the logic circuit coupled with the first switch and a second switch, the second switch coupled with the ramp voltage source circuit; and
a feedback control circuit having inputs coupled with the output of the power converter and the output of the load compensator circuit, the feedback control circuit having an output coupled with the driver circuit.

14. The circuit of claim 13,
wherein the load compensator circuit is configured to be inactive in response to the first switch being in an off position and the second switch being an on position based on the output of the logic circuit while the load compensator circuit detects the change in an output voltage at the output of the power converter to be less than a predetermined threshold amount; and
the load compensator circuit is configured to be active and supply a compensating signal to the feedback circuit in response to the first switch being in an on position and the second switch being in an off position based on output of the logic circuit while the load compensator circuit detects the change in the output voltage to be greater than the predetermined threshold amount.

15. The circuit of claim 14, wherein the load compensator circuit is configured to:
detect a load transient based on a change in the output voltage being greater than a predetermined threshold amount;
detect a rate of change in the output voltage during the load transient; and supply
the compensating signal based on the rate of change; and
the feedback control circuit being configured to generate a series of pulses to control the driver circuit based on the output voltage and the compensating signal.

16. A method, comprising:
performing a power conversion of an input voltage to provide an output voltage at an output;
providing a driver signal for driving the power conversion;
determining a rate of change in the output voltage over a predetermined time period;
supplying a compensating signal based on the rate of change;
generating a series of pulses to control the driver signal based on the output voltage and the compensating signal; and
wherein supplying the compensating signal comprises switching a first switch to an off position and switching a second switch to an on position while a change in the output voltage in response to detecting the load transient greater than a predetermined threshold amount, and the method further comprising switching the first switch to an on position and switching the second switch to an off position while a change in the output voltage in response to detecting the load transient being less than another predetermined threshold amount.

* * * * *